UNITED STATES PATENT OFFICE.

KARL ALBRECHT, OF BIEBRICH, GERMANY, ASSIGNOR TO THE FIRM OF KALLE AND COMPANY, AKTIENGESELLSCHAFT, OF BIEBRICH, GERMANY.

THIO-INDOXYL DERIVATIVES AND PROCESS OF MAKING SAME.

No. 874,649.

Specification of Letters Patent.

Patented Dec. 24, 1907.

Application filed July 30, 1906. Serial No. 328,366.

*To all whom it may concern:*

Be it known that I, KARL ALBRECHT, subject of the King of Prussia, and residing at Biebrich-on-the-Rhine, Germany, have invented certain new and useful Improvements in the Manufacture of Thio-Indoxyl Derivatives and Processes of Making the Same, of which the following is a specification.

My invention relates to the manufacture of a new red coloring matter.

I have found that the thioindoxylic carboxylic acid (alpha-oxythionaphthene carboxylic acid) or thioindoxyl (alpha-oxythionaphthene), described in the specification of the French Letters Patent No. 359,398 may be united with isatin, forming a new product, having presumably the following constitution:

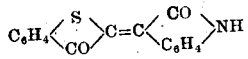

In the following two examples I give modes of operation for the manufacture of the new product, but I do not wish to be understood as intending to limit myself to the special methods therein described as the product may be obtained by other methods.

The essence of my invention consists in combining molecular proportions of thioindoxyl or of thioindoxyl carboxylic acid and isatin.

The manner in which the combining of such substances is accomplished can be varied within wide limits, without affecting the principle of my invention.

Example I. 15 parts of thioindoxyl (alpha-oxythionaphthene) are dissolved in 3000 parts of hot water together with 2.2 parts of calcined soda and then mixed with a solution of 14.7 parts of isatin in 3000 parts of hot water. After boiling for a short time the molecules of thioindoxyl and isatin will have combined with the new product formed. This coloring matter is then filtered off and washed.

Example II. If in the foregoing example the stated quantity of thioindoxyl (alpha-oxythionaphthene) be replaced by the equivalent amount 19.4 parts of thioindoxyl carboxylic acid (alpha-oxythionaphthene carboxylic acid) and the process be carried out as in that example, the same product is obtained. The reaction proceeds in the same way carbon dioxid being evolved.

In the above given examples the thioindoxyl, its carboxylic acid as well as the isatin may be replaced by homologues and derivatives of the same. In this manner substitution products of the new dyestuffs are obtained. The new coloring matter consists of scarlet red crystalline needles, possessing a metallic luster, which are insoluble or difficultly soluble in the usual solvents. Concentrated sulfuric acid dissolves it with a brown coloration. When treated with reducing agents, such as alkaline hydrosulfite or sodium sulfid, the new coloring matter goes into solution with a light yellow color. The leuko compound, contained in this solution, has a good affinity for the textile fibers, which when thus charged with the leuko compound are colored red on contact with the atmospheric air or other oxidizing agent, the reduction product being thereby reoxidized into the coloring matter. In this manner the new dyestuff may be utilized for the production of scarlet red shades upon the fiber, which are exceptionally fast to all agents.

Now what I claim is:

1. The herein described process of manufacturing a red coloring matter consisting in combining thioindoxyl carboxylic acid with isatin.

2. The herein described process of manufacturing a red coloring matter consisting in combining thioindoxyl with isatin.

3. The new dyestuff, having the following constitution

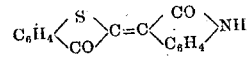

consisting of scarlet red needles, possessing a metallic luster, being insoluble or difficultly soluble in the usual solvents, soluble in concentrated sulfuric acid with a brown color, and which may be transformed by reducing agents into a leuko compound, capable of being reoxidized and precipitated as the dyestuff from its aqueous solution by exposure to air.

In testimony whereof I have signed my name to this specification in the presence of two subscribing witnesses.

KARL ALBRECHT.

Witnesses:
JEAN GRUND,
CARL GRUND.